United States Patent [19]

Torres-Cardona et al.

[11] Patent Number: 5,997,922
[45] Date of Patent: *Dec. 7, 1999

[54] BROILER SKIN AND EGG YOLK PIGMENTATION BY USING SAPONIFIED MARIGOLD EXTRACTS WITH A HIGH CONTENT OF ZEAXANTHIN

[75] Inventors: Mario-David Torres-Cardona, San Nicolás de los Garza; Jose-Odon Torres-Quiroga, San Pedro Garza García, both of Mexico

[73] Assignee: Industrial Organica, S.A. DE C.V., Monterrey, Mexico

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/819,797

[22] Filed: Mar. 18, 1997

[30] Foreign Application Priority Data

Dec. 19, 1996 [MX] Mexico ................................ 966679

[51] Int. Cl.⁶ ........................................................ A23L 1/27
[52] U.S. Cl. ........................ 426/250; 426/540; 426/541
[58] Field of Search ................................. 426/540, 250, 426/541; 568/834

[56] References Cited

U.S. PATENT DOCUMENTS

| | | | |
|---|---|---|---|
| 3,523,138 | 8/1970 | Grant | 260/617 |
| 3,539,686 | 11/1970 | Rosenberg | 424/195 |
| 3,997,679 | 12/1976 | Salkin | 426/250 |
| 3,998,753 | 12/1976 | Antoshkiw et al. | 252/312 |
| 4,048,203 | 9/1977 | Philip | 260/412.8 |
| 5,308,759 | 5/1994 | Gierhart | 435/67 |
| 5,360,730 | 11/1994 | Orndorff et al. | 435/257.1 |
| 5,382,714 | 1/1995 | Khachik | 568/834 |
| 5,523,494 | 6/1996 | Torres-Cardona | 568/834 |

OTHER PUBLICATIONS

Fletcher, Poultry Science, 71:733–743 (1992).
Hamilton, Poultry Science, 71: 718–724 (1992).
Boushy et al., Poultry Production, Jan. 30, 1989.
Quackenbush et al., J. of A.O.A.C., vol. 48, No. 6., 1241–1244 (1965).
Marusich et al., Poultry Science, 55: 1486–1494 (1976).
Wagstaff, Feedstuffs, Jan. 23, 1984.
Fletcher, Poultry Science, 65: 1708–1714 (1986).
Yacowitz et al., Poultry Science, 57: 443–448 (1978).
Epstein, Addition for Poultry Feed, 1965.

*Primary Examiner*—Cynthia L. Nessler
*Attorney, Agent, or Firm*—Abelman, Frayne & Schwab

[57] ABSTRACT

A saponified marigold extract having a zeaxanthin content between about 20% to 80% of the total xantophylls, as well as a formulation and a method of dosing, comprising incorporating about 10 to 55 ppm. of the saponified marigold xantophylls having a zeaxanthin content of about 20% to 80% in the bird feed or beverage, for the pigmentation of the broiler skin and yolk egg, to impart them the right hue as the market requires.

4 Claims, No Drawings

BROILER SKIN AND EGG YOLK PIGMENTATION BY USING SAPONIFIED MARIGOLD EXTRACTS WITH A HIGH CONTENT OF ZEAXANTHIN

BACKGROUND OF THE INVENTION

A. Field of the Invention

This invention is related to the pigmentation of broiler skin and egg yolk and more particularly, to an extract, a formulation that can be used as broiler feed or drink, and a method for the dosage of such formulation, in order to achieve the right hue that the market requires in the pigmentation of broiler skin and egg yolk.

B. Description of the Related Art

The right color of the broiler skin, and of the egg yolk is widely known as an important quality attribute, which has been taken as synonymous of healthy of the broilers and eggs. However, each region of the world has established its own particular specifications for this parameter. So that the optimum pigmentation for the broiler skin and the egg yolk depends on cultural traditions or preferences (Fletcher, 1992, Poultry Science 71:733–743)).

Therefore, different methodologies to measure the color of both the broiler skin and the egg yolk, have been adopted. As examples of these methodologies are The Roche Colour Fan (RCF) methodology, that is considered a subjective determination, and The Reflectance Chromameter methodology, which is used to make precise objective determinations.

A great effort has recently been made to standardize the available High Performance Liquid Chromatography (HPLC) methodology (Hamilton, 1992, Poultry Science 71:718–724), in order to be able to quantify with more precision the xantophylls contained in the skin of broilers, as well as in the feed and in the egg yolk. However, notwithstanding the advancement of such techniques, it is still difficult to avoid the subjective evaluation of color in the above mentioned products.

Traditionally, the poultry keepers have been incorporating red and yellow pigments (natural or synthetic), in the birds feed.

Synthetic cantaxanthin has been used for decades as active pigment to provide a yellow-orange color to the broiler skin, and to provide intense orange and even rose hues to egg yolk (Geisendorf, 1965).

Rosenberg, in his U.S. Pat. No. 3,539,686 issued in November 1970, demonstrated that it is possible to obtain a wide range of tones going from yellow to red hues in broiler skin and egg yolk, by using blends of xantophylls or zeaxanthin with one or more pigments such as cantaxanthin, beta-apo-8-carotenal, ethyl ester of the beta-apo-8-carotenoic acid, and extracts from paprika and red peppers. Rosenberg work determined that it is a requirement to use a red pigment in order to obtain more intense orange or reddish hues, as compared with the hues obtained if only yellow xantophylls were used, because of the synergistic effect obtained when both pigments are used.

A great amount of research has been carried out tying to determine the different proportions of yellow xantophylls and red pigments in order to obtain specific hues in the broiler skin and in egg yolk (Boushy, Foodstuffs, January, 1989). Among them, the works of Quackenbush (1965 Journal of the .A.O.A.C., 48(6):1241–1244) and Marusich (1976 Poultry Science, 55:1486–1494) are of importance because they shown that the zeaxanthin is a more efficient pigmentation than lutein, besides of imparting an orange hue to the broiler skin.

According to the requirements of specific markets for broilers and egg yolk pigmentation, different strategies are observed. For instance, in Mexico it is preferred to saturate the broiler skin with yellow pigment and then supplement with red xantophylls in order to obtain orange hues. To obtain the desired orange hue, a dosage of 60 to 70 ppm. of marigold xantophylls, together with 5 to 10 ppm. of yellow corn gluten xantophylls, and from 2 to 5 ppm. of cantaxanthin or an equivalent red pigment, are added to the feed.

In other countries, such as in the USA, Argentina, Chile, Spain, Portugal, France and Austria, the market prefers a more yellowish tone taking advantage of red xantophylls to obtain a more intense hue. This is obtained by dosing from 10 to 15 ppm. of yellow corn gluten xantophylls, 5 to 22 ppm. of marigold xantophylls, and 0 to 3 ppm. of cantaxanthin or an equivalent red pigment in the broiler feed.

Traditional sources of yellow xantophylls are: alfalfa, yellow corn, yellow corn gluten, and marigold meal concentrates, wherein it has been demonstrated that the saponified natural pigment has a better bioavailability than the non saponified pigment (Wagstaff, 1984; Fletcher, 1986, Poultry Science 65:1708–1714).

The synthetic red pigment more frequently used, is cantaxanthin (Hoffman-La Roche, BASF), but this is very expensive and the pigmentation obtained with it, is not satisfactory. The use of this pigment in Japan and Australia seems to be limited. There are also natural red sources as the capsanthin (paprika or red pepper) and synthetic yellow sources, like the ethyl ester of the beta-apo-8-carotenoic acid (Hoffman-La Roche) and the synthetic citranaxanthin (BASF).

It has been recently reported the preparation of a saponified marigold extract with a high content of zeaxanthin called Hi-Gold which is a trademark of industrial Orgánica, S.A. de C.V., obtained by a process for the isomerization of lutein contained in the extract, as is described in Torres et al U.S. Pat. No 5,523,494 issued in June 1996.

That patent describes the application of Hi-Gold for broiler skin and egg yolks pigmentation purposes eliminating the use of red pigments. Besides, it is demonstrated that by using Hi-Gold, deeper hues are obtained in broiler skin and egg yolk than those obtained when only the traditionally yellow pigments are used alone.

SUMMARY OF THE INVENTION

It is therefore a main object of the present invention to provide an extract of saponified marigold with a content of zeaxanthin between about 20% and 80% of the total xantophylls.

It is also a main object of the present invention, to provide a pigmenting formulation to be used in the pigmentation of broiler skin and egg yolk having a saponified marigold xantophylls content of between about 10 to 55 ppm. and a zeaxanthin content between about 20% to 80%.

It is another main object of the present invention, to provide a pigmenting formulation to be used in the pigmentation of broiler skin and egg yolk, of the above disclosed nature, in order to obtain orange-yellow hues without using red pigment.

It is an additional object of the present invention, to provide a pigmenting formulation to be used in the pigmentation of broiler skin and egg yolk of the above disclosed nature, in order to obtain more intense yellow hues in the egg yolk, as compared to those obtained with the traditional yellow pigments, without using red pigments.

It is yet a main object of the present invention, to provide a pigmenting formulation to be used in the pigmentation of broiler skin and egg yolk of the above disclosed nature, which avoid the use of expensive synthetic pigments and therefore is better accepted in the legislation around the world, and results more profitable because it does not contain additional pigments.

It is a further object of the present invention, to provide a method for the pigmentation of broiler skin and egg yolk which includes incorporating a formulation with a content of saponified marigold xantophylls between about 10 to 55 ppm., and a content of zeaxanthin of about 20% to 80%, mixed in the feed of the birds in order to obtain orange hues in the broiler skin, without using red pigments, and more intense yellow hues in the egg yolk compared to those obtained with the traditional yellow pigments.

DETAILED DESCRIPTION OF THE INVENTION

A series of different examples follows, regarding experimental farm evaluations where the pigmenting value of Hi-Gold is compared against other commercial pigments available, alone or combined.

In all trials one day chicks were used according to the normal practice for the first 21 days, including N. Castle, Infectious Bronchitis and Gumboro vaccinations. Clinical evaluations were performed on days number 21 and 35, without detecting any disease symptoms.

All the pigmentation trials were carried out with typical diets: sorghum-soybean, corn-soybean, barley-soybean, according to the NCR.94 recommendations (Nutrient Requirements of Poultry 9th. Academic Press, Washington, D.C.).

The feed was prepared according to the normal procedure of mixing the grounded cereals and soybean, followed by the addition of microingredients, including the pigment, dosed in parts per million (grams per tons, or cubic centimeters per cubic meter of beverage) and the fat. The mixing operation continued for three additional minutes.

Feed and water were available ad-libitum. At the end of each trial the birds were slaughtered, scalded at 52° C. for 1.30 minutes, and defeathered.

No significant differences were found in the mortality rate, feed consumption and weight parameters, when comparing the different lots separated by sex.

In most of the trials a Hunterlab Miniscan Reflectance Chromameter was used for the evaluation of color. The coordinates system used was CIE L*a*b*, according to Yacowitz recommendations (1978 Poultry Science, 57:443–448), where L* is luminosity, a* is redness and b* is yellowness. Color hue was evaluated as a*/b*×100 according to Huyghebaert (the utilization of oxycarotenoids for egg yolk pigmentation Thesis. Univestiteit Gent. Belgium 1993).

EXAMPLE 1

1600 one day old Hubbard chicks were separated in two treatments, each one with four repetitions: 2 male lots and 2 female lots.

A typical sorghum-soybean diet was fed during the first 21 days. From day 22 to day 49 they were fed with the same diet, containing the following pigment doses:

Group 1 Lots . . . 60 ppm. of marigold xantophylls+2 ppm. cantaxanthin.

Group 2 Lots . . . 55 ppm. Hi-Gold.

On day 49 the breast skin color was determined to 10 alive broilers selected at random for each repetition. After slaughtered and processed the color was determined on the fat path by the breast side. The results obtained were as follows:

|  | Males | | | Females | | | |
|---|---|---|---|---|---|---|---|
| Group | L* | a* | a*/b* × 100 | L* | a* | b* | a*/b* × 100 |
| Alive | | | | | | | |
| Control (1) | 61.9 | 8.1 | 29.5 | 62.4 | 8.4 | 28.8 | 29.1 |
| Trial (2) | 63.9 | 8.3 | 28.3 | 63.0 | 8.5 | 29.4 | 28.9 |
| Processed | | | | | | | |
| Control (1) | 69.5 | 6.8 | 15.0 | | | | |
| Trial (2) | 67.8 | 7.8 | 19.0 | | | | |

L* = luminosity (the higher L* value, the more faded) a* = redness and b* = yellowness).

L*=luminosity (the higher L* value, the more faded) a*=redness and b*=yellowness).

A higher value for b* (yellowness) was obtained on alive male birds in Trial (2) which contained Hi-Gold. After processing it was observed that a higher a* (redness) value was obtained in trial (2) with Hi-Gold, but for the same group a lower b* value was obtained. This had already been reported (Amena Proceedings 1993, Acapulco) when using the CIE L*a*b* coordinate system; if a* value increases, there is a decrease in b* value. The hue value a*/b* for the groups with Hi-Gold only, is the same or better than those with marigold+cantaxanthin.

The pigmentation of broilers with Hi-Gold is more efficient than when using marigold xantophylls+cantaxanthin (3.5% of total of xantophylls).

EXAMPLE 2

160 one day Peterson x Arbor Acres male broilers were separated in 4 treatments, each lot with two repetitions of 20 each.

A typical corn-soybean diet was fed during the first 21 days. From day 22 to day 42 they were fed with the same diet containing the following pigment doses:

Group 1 Lots . . . Basal (10 ppm. of xantophylls)+25 ppm. marigold xant. (Oroglo, Kemin)

Group 2 Lots . . . Basal (10 ppm. of xantophylls)+25 ppm. Hi-Gold

Group 3 Lots . . . Basal (10 ppm. of xantophylls)+25 ppm. yellow corn wheat gluten Group 4 Lots . . . Same as Group (3)+1 ppm. cantaxanthin.

On day 42 the pigmentation on the shanks was evaluated by visual comparison using the American Hoechst Corporation 1980 color fan, under midday light conditions. The results obtained were as follows:

| Group | A. Hoechst Corp. color Fan |
|---|---|
| 1. Marigold | 3.28 |
| 2. Hi-Gold | 5.60 |

| Group | A. Hoechst Corp. color Fan |
| --- | --- |
| 3. Corn gluten | 3.35 |
| 4. Corn Gluten + cantaxanthin | 4.02 |

The shanks pigmentation were different for the several groups. With Hi-Gold a yellow orange color was obtained, with corn gluten+cantaxanthin an intense yellow color was obtained, and groups (1) and (3) had a pale yellow color.

EXAMPLE 3

720 one day Arbor Acres male broilers were separated into 6 treatments, each lot with 3 repetitions of 40 chicks each one. A typical sorghum-soybean diet was fed during the first 21 days. From day 22 to day 49 they were fed the same diet plus 5% of corn gluten (Basal 10 ppm. of xantophylls) plus the following pigment doses:

Group 1 Lots . . . 15 ppm. marigold xantophylls (Lutexan 11, Industrial Organica S.A. de C.V.)
Group 2 Lots . . . 25 ppm. marigold xantophylls (Lutexan 11)
Group 3 Lots . . . 10 ppm. Hi-Gold
Group 4 Lots . . . 15 ppm. Hi-Gold
Group 5 Lots . . . 20 ppm. Hi-Gold
Group 6 Lots . . . 25 ppm. Hi-Gold On day 49 the broilers were slaughtered and processed, and a number of 10 birds per repetition were randomly selected. The pigment was determined on the fat path by the breast side. The following results were obtained:

| | Color measurement | | | |
| --- | --- | --- | --- | --- |
| Group | $L^*$ | $a^*$ | $b^*$ | $a^*/b^* \times 100$ |
| 1. Marigold 25 ppm. total | 68.7 | 6.0 | 34.5 | 17.3 |
| 2. Marigold 35 ppm. total | 68.6 | 6.5 | 36.9 | 17.6 |
| 3. Hi-Gold 20 ppm. total | 69.9 | 5.6 | 31.6 | 17.7 |
| 4. Hi-Gold 25 ppm. total | 69.2 | 6.4 | 35.0 | 18.3 |
| 5. Hi-Gold 30 ppm. total | 68.6 | 7.4 | 36.6 | 20.2 |
| 6. Hi-Gold 35 ppm. total | 68.5 | 6.9 | 36.5 | 18.9 |

Redness values $a^*$ were similar for the trial with the higher content of marigold and those treatments with Hi-Gold containing 70%, 85% and 100% of total xantophylls. Yellowness values $b^*$ were similar for the groups containing 25 ppm. of marigold and 25 ppm. of Hi-Gold. For the 35 ppm. marigold dose groups, $b^*$ values were similar to the Hi-Gold groups that contained 85% and 100% of total xantophylls. Hue values $a^*/b^*$ are better for the groups with Hi-Gold than those with marigold.

By evaluation of the color according to $b^*$ values, Hi-Gold can save 15% of pigment as compared to marigold. And evaluating the color according to $a^*$ values, Hi-Gold can save up to 30% of pigment as compared to marigold.

EXAMPLE 4

600 one day old Arbor Acres male chicks were separated in 5 treatments, each lot with 3 repetitions with 40 chicks each one. A typical sorghum-soybean diet was fed for the first 21 days, and from day 22 to day 49 they were fed with the same diet containing 2.5% of corn gluten (5 ppm. of xantophylls), plus the following pigments:

Group 1 Lots . . . 55 ppm. marigold xantophylls (Lutexan 11)
Group 2 Lots . . . 55 ppm. marigold xantophylls (Lutexan 11)+3 ppm. cantaxanthin, (Carophyll red, Hoffman-La Roche)
Group 3 Lots . . . 55 ppm. marigold xantophylls (Lutexan 11)+6 ppm. cantaxanthin, (Carophyll red)
Group 4 Lots . . . 55 ppm. Hi-Gold
Group 5 Lots . . . 45 ppm. Hi-Gold On day 49 the broilers were processed and a number of 10 broilers were selected randomly. The color measurement was determined on the fat path by the breast side. The following results were observed:

| Group | $L^*$ | $a^*$ | $b^*$ | $a^*/b^* \times 100$ |
| --- | --- | --- | --- | --- |
| 1. Marigold 60 ppm. total | 67.5 | 8.7 | 42.8 | 20.3 |
| 2. Marigold 60 + 3 Cantax. | 66.6 | 9.5 | 41.7 | 22.7 |
| 3. Marigold 60 + 6 Cantax. | 66.3 | 10.3 | 43.2 | 23.8 |
| 4. Hi-Gold 60 ppm. | 66.7 | 9.6 | 41.1 | 23.4 |
| 5. Hi-Gold 50 ppm. | 66.9 | 8.8 | 39.9 | 22.0 |

Treatments number (2) and number (4) yield very similar results. Hi-Gold replaces marigold plus cantaxanthin in such dose level. Lower values for $a^*$ were obtained in treatments (1) and (5), that do not contain cantaxanthin, however the dose of xantophylls in Hi-Gold was only 83% of the total xantophylls contained in treatment number (1); $b^*$ values for treatments (1), (2) and 4 were similar. The higher $b^*$ value was obtained in treatment number (3), which contains a high level of cantaxanthin.

It can be observed that the hue value $a^*/b^* \times 100$ increases in those groups (2,3) where cantaxanthin is added, and that the same effect happens even more noticeable, in those groups containing Hi-Gold only (4,5).

EXAMPLE 5

120 one day old Arbor Acres chicks were divided in 4 treatments, each lot with 3 repetitions, with 10 broilers each. A typical barley-soybean diet was fed for the first 21 days. From day 22 until day 49 the feed was supplemented with the following pigments:

Group 1 Lots . . . 36 ppm. marigold xantophylls (Chromophyll Oro)+3 ppm. cantaxanthin, (red Carophyll).
Group 2 Lots . . . 36 ppm. Hi-Gold.
Group 3 Lots . . . 39 ppm. Hi-Gold.
Group 4 Lots . . . 30 ppm. Hi-Gold+3 ppm. cantaxanthin (Red Carophyll).

On day 49 the birds were slaughtered and processed. From each repetition 10 broilers were selected randomly and kept in a freezer for 24 hours. Afterwards, the color measurement was carried out at the fat path by the breast side.

| | Color measurement | | | |
| --- | --- | --- | --- | --- |
| Group | $L^*$ | $a^*$ | $b^*$ | $a^*/b^* \times 100$ |
| 1. Marigold 36 ppm. + 3 cantax. | 73.3 | 7.9 | 34.2 | 23.0 |
| 2. Hi-Gold 36 ppm. | 74.9 | 6.2 | 31.8 | 19.4 |
| 3. Hi-Gold 39 ppm. | 73.8 | 7.5 | 32.6 | 23.0 |
| 4. Hi-Gold 30 ppm. + 3 cantax. | 74.9 | 7.3 | 31.1 | 23.4 |

The lower $a^*$ values (redness) obtained were for the group containing only 36 ppm. of Hi-Gold. The other treatments yielded very similar redness values. There was no noticeable difference for b* values (yellowness) among the groups that contained marigold plus cantaxanthin, or Hi-Gold alone, or Hi-Gold plus cantaxanthin. The hue value a*/b*×100, shows that only group 2, which had a lower dose of Hi-Gold, is slightly lower. However group 3, Hi-Gold only, shows very similar results to groups 1 and 4, both containing cantaxanthin.

Dosing Hi-Gold at a higher level of only 8% based on marigold, can replace marigold plus 10%+cantaxanthin. Drastically reducing (17%) the Hi-Gold levels as in group (4), does not yield similar yellowness.

EXAMPLE 6

36 laying hens (Lohmann Brown) were separated according to a factorial arrangement emphasizing the following main effects: 2 yellow levels, 2 red levels, and 2 levels of yellow:red ratio. The experiment was designed randomly.

A typical barley-soybean diet was fed for the first 10 days. From day 11 until day 25 the following pigments were added to the diet:

Group 2 . . . 11 ppm. marigold (Cromophyll Oro, CO)+4 ppm. Cr (Red Carophyll, CR)

Group 3 . . . 8 ppm. Hi-Gold+4 ppm. CR

Group 5 . . . 11 ppm. of CO+6 ppm. of Hi-Red (Hi-Red is a Trademark of Industrial Orgánica S.A. de C.V.)

Group 6 . . . 8 ppm. Hi-Gold+6 ppm. Hi-Red

Group 8 . . . 14 ppm. CO+3 ppm. CR

Group 9 . . . 12 ppm. Hi-Gold+3 ppm. CR

Group 11 . . . 14 ppm. CO+4.5 Hi-Red

Group 12 . . . 12 ppm. Hi-Gold+4.5 Hi-Red

On days 23-24-25 after the pigments were added to the feed, all eggs produced were collected and broken to perform a color evaluation of the yolk by means of a Roche Color Fan (RCF93). Furthermore, the egg yolk color was evaluated with a CR300 Minolta Chromameter using the CIE L*a*b* coordinates. There were no significant differences among the several groups regarding feed consumption, eggs weight, and laying percentage. The following results were obtained:

|  | Hi-Gold | CO | CR | Hi-Red | *A:R = 8.4 | A:R = 12.3 |
| --- | --- | --- | --- | --- | --- | --- |
| L* | 62.2 | 62.4 | 61.4 | 62.5 | 61.8 | 62.1 |
| a* | 9.5 | 8.8 | 11.5 | 7.6 | 10.0 | 9.1 |
| b* | 47.5 | 48.7 | 46.2 | 49.2 | 45.6 | 48.9 |
| a*/b/× 100 | 20.0 | 18.0 | 24.9 | 15.4 | 21.9 | 18.6 |
| RCF93 | 13.2 | 13.1 | 13.7 | 12.7 | 13.4 | 13.1 |

*A/R = yellow to red ratio

*A/R=yellow to red ratio

Hi-Gold is 1.2 times more efficient than marigold (Cromophyll Oro) in the pigmentation of yolk. A ratio of 8:4 yellow:red yields a more intense yolk color than the 12:3 ratio.

EXAMPLE 7

A total of 144 laying hens 34 weeks old, were arranged in 4 treatments with three repetitions each, 12 birds per repetition. The yolks obtained were used in the preparation of pasta.

After 5 days of a typical sorghum-soybean white diet, the layers were fed for 21 additional days with the same feed that contained the following pigments:

Group 1 . . . 35 ppm. marigold (Lutexan 11)

Group 2 . . . 20 ppm. Hi-Gold

Group 3 . . . 25 ppm. Hi-Gold

Group 4 . . . 30 ppm. Hi-Gold

After day 21, the yolk color was evaluated with a Roche colour Fan 93 and a CR300 Minolta Reflectance Chromameter. Each yolk group was analyzed for its content of total xantophylls, according to the AOAC Method.

| Group | RCF93 | L* | a* | b* | a*/b* × 100 | Xt, ppm. | % Deposition |
| --- | --- | --- | --- | --- | --- | --- | --- |
| 1 | 9 | 68.4 | −0.95 | 60.9 | — | 26.5 | 14 |
| 2 | 8 | 71.3 | −2.50 | 59.1 | — | 15.5 | 14 |
| 3 | 9 | 69.0 | −1.30 | 60.8 | — | 16.4 | 12 |
| 4 | 10 | 69.4 | 0.1 | 63.2 | 1.6 | 20.7 | 12.5 |

The results of the above table indicate that Hi-Gold is 1.4 times stronger than marigold as egg yolk pigment.

We claim:

1. A method for the orange tone pigmentation of broiler skin and egg yolk, comprising: dosing about 8 to 55 ppm of saponified xanthophylls having a zeaxanthin content of about 20 to about 80%, in the feed, beverage, or both, of broilers and laying hens, in the absence of natural or synthetic red pigments.

2. A method as claimed in claim 1, wherein the xanthophylls are present between about 20 to about 30 ppm.

3. A method as claimed in claim 1, wherein the xanthophylls are present in an amount of about 30 to about 39 ppm.

4. A method as claimed in claim 1, wherein the xanthophylls are present in an amount of about 8 to about 12 ppm.

* * * * *